United States Patent
Zheng et al.

(10) Patent No.: US 12,106,784 B2
(45) Date of Patent: Oct. 1, 2024

(54) READ SENSOR WITH ORDERED HEUSLER ALLOY FREE LAYER AND SEMICONDUCTOR BARRIER LAYER

(71) Applicant: Western Digital Technologies, Inc., San Jose, CA (US)

(72) Inventors: Yuankai Zheng, Fremont, CA (US); Susumu Okamura, San Jose, CA (US); Brian R. York, San Jose, CA (US); Zhitao Diao, Fremont, CA (US); James Mac Freitag, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/227,537

(22) Filed: Jul. 28, 2023

(65) Prior Publication Data
US 2024/0194221 A1     Jun. 13, 2024

Related U.S. Application Data

(60) Provisional application No. 63/431,252, filed on Dec. 8, 2022.

(51) Int. Cl.
*G11B 5/31*        (2006.01)
*G11B 5/39*        (2006.01)

(52) U.S. Cl.
CPC ............ *G11B 5/3146* (2013.01); *G11B 5/314* (2013.01); *G11B 5/3929* (2013.01)

(58) Field of Classification Search
None
See application file for complete search history.

(56) References Cited

U.S. PATENT DOCUMENTS

| | | | |
|---|---|---|---|
| 5,173,955 A * | 12/1992 | Yamanishi | G11B 11/10584 385/8 |
| 7,310,207 B2 | 12/2007 | Hasegawa et al. | |
| 9,042,057 B1 | 5/2015 | Diao et al. | |
| 9,508,365 B1 * | 11/2016 | Zheng | G11B 5/3903 |
| 10,867,625 B1 | 12/2020 | Freitag et al. | |
| 11,127,420 B1 * | 9/2021 | Freitag | G11B 5/314 |
| 2007/0053113 A1 * | 3/2007 | Papworth Parkin | H01F 10/3254 257/E43.006 |
| 2007/0297099 A1 * | 12/2007 | Hirata | B82Y 25/00 |

(Continued)

*Primary Examiner* — William J Klimowicz
(74) *Attorney, Agent, or Firm* — PATTERSON + SHERIDAN, LLP (57) ABSTRACT

Embodiments of the present disclosure generally relate to a read sensor utilized in a read head. The read sensor comprises an amorphous break layer disposed on a shield, a seed layer disposed on the amorphous break layer, a first ferromagnetic layer disposed on the seed layer, a barrier layer disposed on the first ferromagnetic layer, and a second ferromagnetic layer disposed on the barrier layer. The amorphous break layer comprises CoFeBTa, the seed layer comprises RuAl, and the barrier layer comprises a semiconductor material, such as ZnSe, ZnTe, ZnO, CuSe, or CuInGaSe. The semiconductor barrier layer reduces the resistance-area product of the read sensor. The amorphous break layer breaks the texture between the shield, which has a FCC texture, and the seed layer, which has a BCC texture. The BCC texture of the seed layer is then inherited by the remaining layers disposed over the seed layer.

21 Claims, 6 Drawing Sheets

(56) References Cited

U.S. PATENT DOCUMENTS

| | | | |
|---|---|---|---|
| 2009/0174968 A1* | 7/2009 | Singleton | G11B 5/398 |
| | | | 360/319 |
| 2013/0078482 A1* | 3/2013 | Shukh | H01F 10/16 |
| | | | 428/811.1 |
| 2021/0183557 A1* | 6/2021 | Carpenter | H01F 10/3295 |
| 2022/0036934 A1* | 2/2022 | Prasad | G11C 11/18 |

* cited by examiner

READ SENSOR WITH ORDERED HEUSLER ALLOY FREE LAYER AND SEMICONDUCTOR BARRIER LAYER

CROSS-REFERENCE TO RELATED APPLICATIONS

This application claims benefit of U.S. provisional patent application Ser. No. 63/431,252, filed Dec. 8, 2022, which is herein incorporated by reference.

BACKGROUND OF THE DISCLOSURE

Field of the Disclosure

Embodiments of the present disclosure generally relate to a read sensor utilized in a read head.

Description of the Related Art

Read heads, which are configured to read data from a media, comprise a read sensor, such as a tunneling magnetoresistance (TMR) read sensor, also called a magnetic tunneling junction (MTJ) read sensor, or a dual free layer (DFL) read sensor. A TMR read sensor is comprised of a seed layer disposed over a shield, a first ferromagnetic layer disposed over the seed layer, a barrier layer disposed over the first ferromagnetic layer, and a second ferromagnetic layer disposed over the barrier layer, where at least one of the ferromagnetic layers is a free layer.

The seed layer typically comprises a magnetic material having an FCC crystalline structure, and the first and second ferromagnetic layers typically comprise materials having a BCC crystalline structure. Because the seed layer comprises an FCC material, it can be difficult to grow the BCC material of the first ferromagnetic layer over the seed layer, often requiring being annealed at high temperatures, such as 500° C. However, TMR or MTJ devices generally cannot withstand annealing temperatures greater than about 400° C. without breaking down. Additionally, even if the ferromagnetic layers are able to be deposited with a BCC texture, the ferromagnetic layers are not highly ordered, resulting in the read sensor having a low magnetic resistance (MR), which prevents the read sensor from achieving ultrahigh density reading.

Therefore, there is a need in the art for a read sensor having one or more highly ordered ferromagnetic layers having a BCC texture without having to use high annealing temperatures.

SUMMARY OF THE DISCLOSURE

Embodiments of the present disclosure generally relate to a read sensor utilized in a read head. The read sensor comprises an amorphous break layer disposed on a shield, a seed layer disposed on the amorphous break layer, a first ferromagnetic layer disposed on the seed layer, a barrier layer disposed on the first ferromagnetic layer, and a second ferromagnetic layer disposed on the barrier layer. The amorphous break layer comprises CoFeBTa, the seed layer comprises RuAl, and the barrier layer comprises a semiconductor material, such as ZnSe, ZnTe, ZnO, CuSe, or CuInGaSe. The semiconductor barrier layer reduces the resistance-area product of the read sensor. The amorphous break layer breaks the texture between the shield, which has a FCC texture, and the seed layer, which has a BCC texture. The BCC texture of the seed layer is then inherited by the remaining layers disposed over the seed layer.

In one embodiment, a read sensor comprises a shield, an amorphous break layer disposed over the shield, a seed layer disposed over the amorphous break layer, the seed layer having a BCC texture and a (100) orientation, a first ferromagnetic layer disposed over the seed layer, the first ferromagnetic layer having a BCC texture and a (100) orientation, a barrier layer disposed over the first ferromagnetic layer, the barrier layer comprising a semiconductor material, and a second ferromagnetic layer disposed over the barrier layer.

In another embodiment, a read sensor comprises a shield, an amorphous break layer disposed over the shield, a seed layer comprising RuAl disposed over the amorphous break layer, the seed layer having a BCC texture and a (100) orientation, a first Heusler alloy layer disposed over the seed layer, the first ferromagnetic layer having a BCC texture and a (100) orientation, a semiconductor barrier layer disposed over the first Heusler alloy layer, the semiconductor barrier layer comprising ZnSe, ZnTe, ZnO, CuSe, or CuInGaSe, and a second Heusler alloy layer disposed over the semiconductor barrier layer, the second Heusler alloy layer having a BCC texture and a (100) orientation.

In yet another embodiment, a read sensor comprises a substrate, a magnetic shield disposed on the substrate, the magnetic shield having a FCC texture, an amorphous break layer disposed on the shield, the amorphous break layer comprising CoFeBTa, a seed layer comprising RuAl disposed on the amorphous break layer, the seed layer having a BCC texture and a (100) orientation, a first ferromagnetic layer disposed on the seed layer, the first ferromagnetic layer having a BCC texture and a (100) orientation, a semiconductor barrier layer disposed on the first Heusler alloy layer, the semiconductor barrier layer comprising ZnSe, ZnTe, ZnO, CuSe, or CuInGaSe, a second ferromagnetic layer disposed over the barrier layer, the second ferromagnetic layer having a BCC texture and a (100) orientation, and a cap layer disposed over the second ferromagnetic layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a read sensor utilized in a read head. The read sensor comprises an amorphous break layer disposed on a shield, a seed layer disposed on the amorphous break layer, a first ferromagnetic layer disposed on the seed layer, a barrier layer disposed on the first ferromagnetic layer, and a second ferromagnetic layer disposed on the barrier layer. The amorphous break layer comprises CoFeBTa, the seed layer comprises RuAl, and the barrier layer comprises a semiconductor material, such as ZnSe, ZnTe, ZnO, CuSe, or CuInGaSe. The semiconductor barrier layer reduces the resistance-area product of the read sensor. The amorphous break layer breaks the texture between the shield, which has a FCC texture, and the seed layer, which has a BCC texture. The BCC texture of the seed layer is then inherited by the remaining layers disposed over the seed layer.

Figure 1:
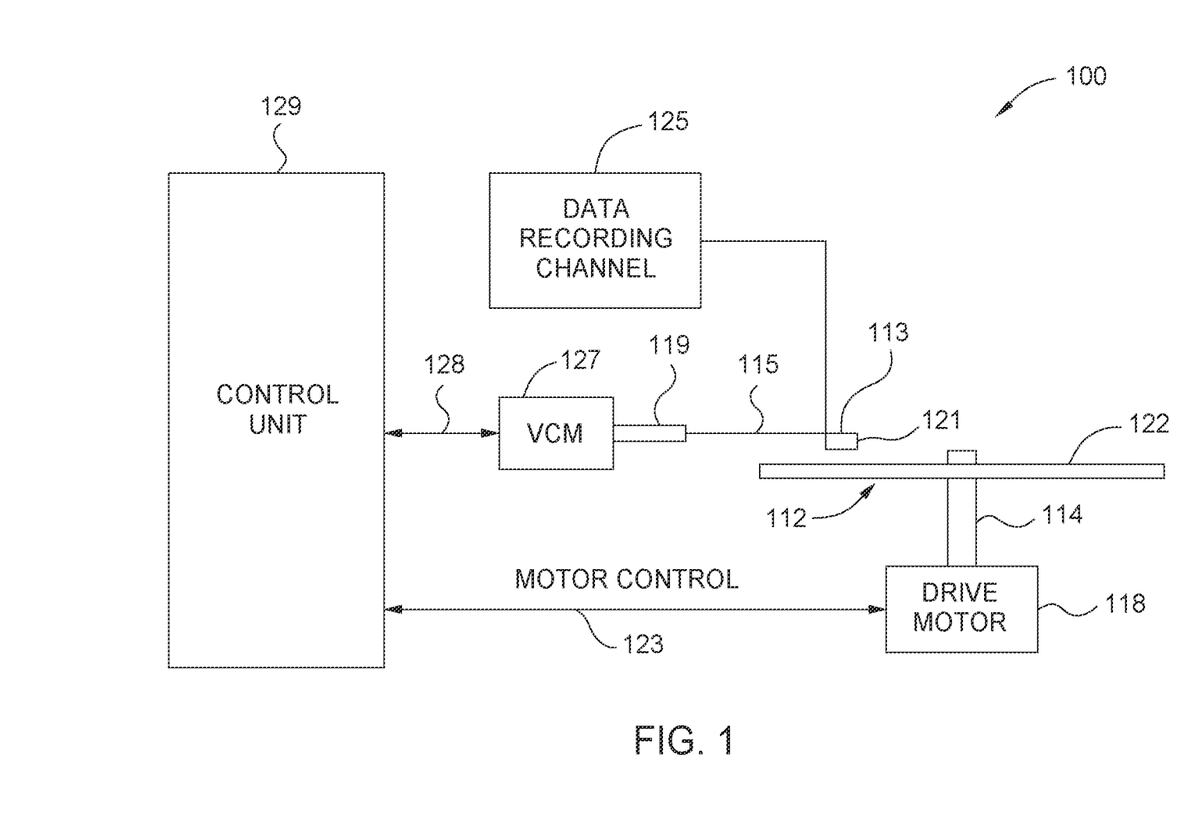
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
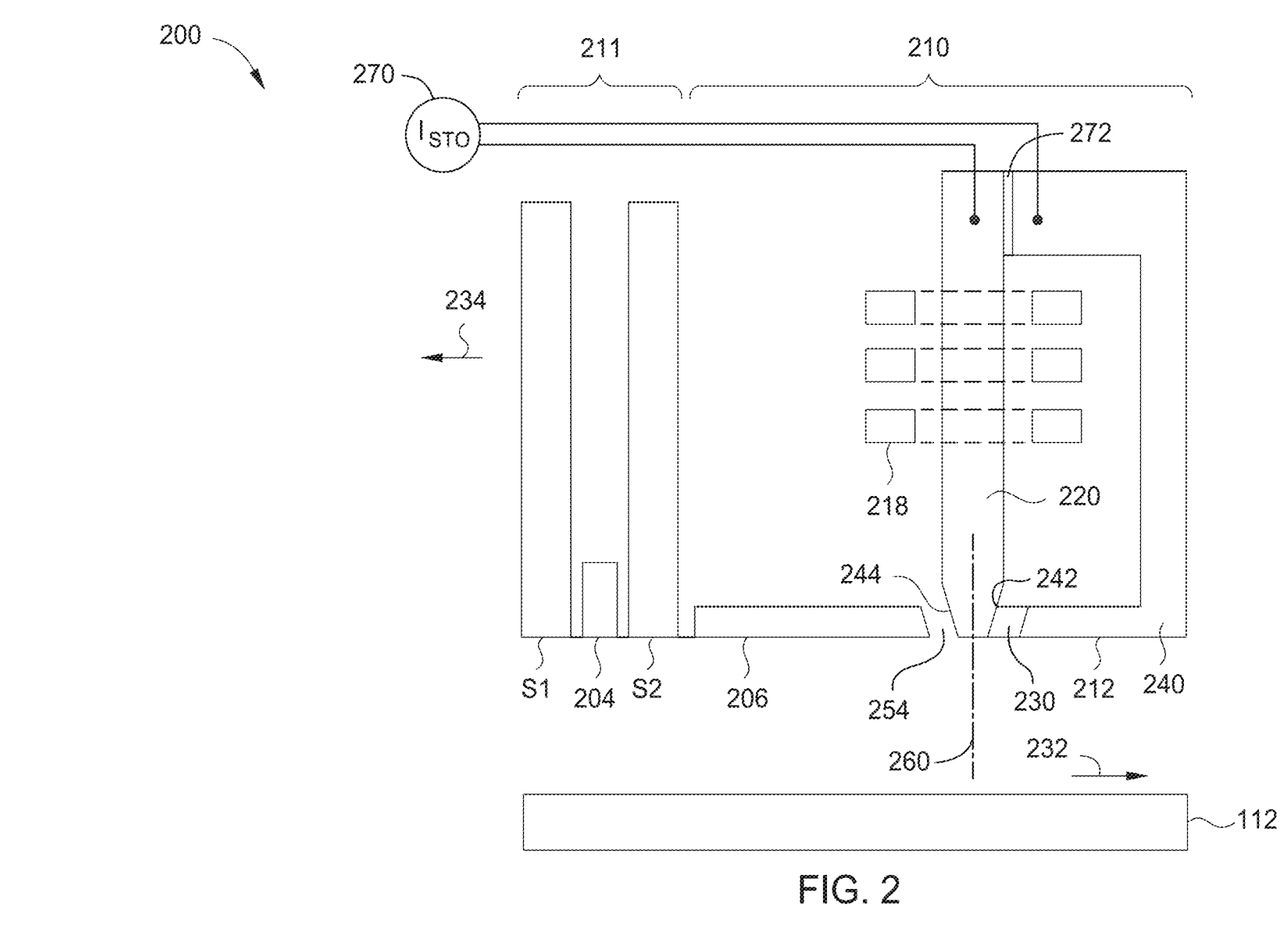
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magnetoresistive (TMR) effect, a magnetoresistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode.

Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3:
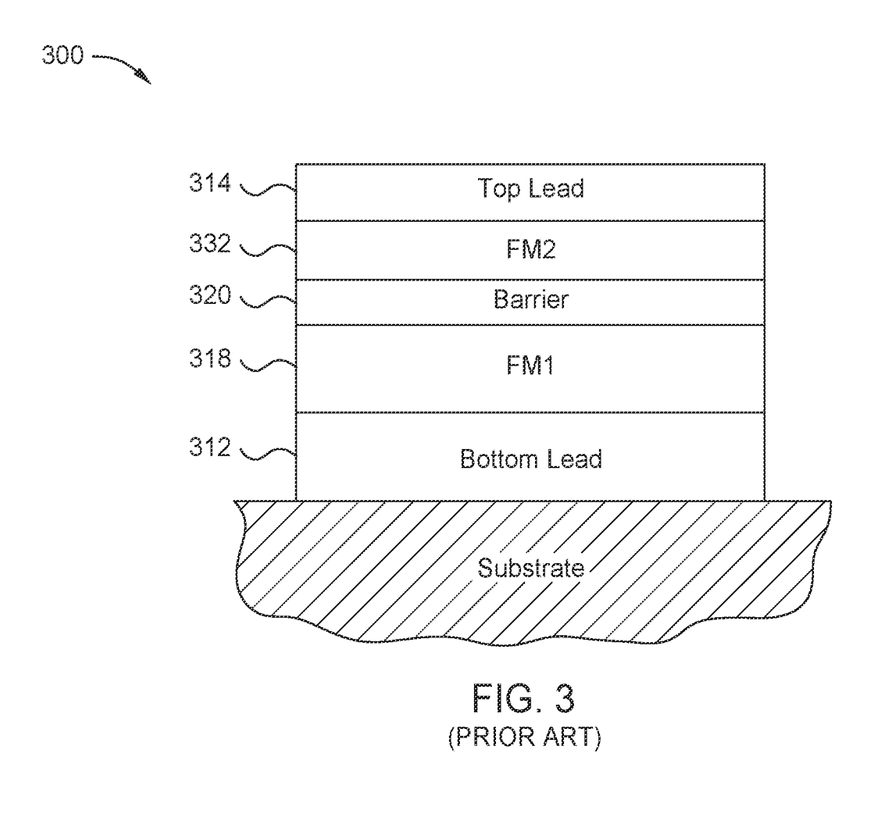
FIG. 3 illustrates a cross-sectional view of a general read sensor which may be a DFL read sensor or a pinned-type read sensor.

FIG. 3 illustrates a cross-sectional view of a general read sensor 300 which may be a DFL read sensor or a pinned-type read sensor. The read sensor 300 may be used as a read head in magnetic recording devices, like a hard disk drive, as shown in the magnetic recording device 100 of FIG. 1 and/or the head assembly 200 of FIG. 2. The read sensor 300 may be a TMR device or a MTJ device.

The read sensor 300 includes a bottom ferromagnetic (FM1) layer 318, an insulating tunneling barrier layer 320, and a top ferromagnetic (FM2) layer 332. The read sensor 300 has bottom and top nonmagnetic electrodes or leads 312, 314, respectively, with the bottom nonmagnetic electrode 312 being formed on a suitable substrate. A seed layer (not shown) can be located between the bottom lead and FM1, and a cap layer (not shown) can be located between FM2 and the top lead). In a DFL read head, both FM1 and FM2 are "free" ferromagnetic layers because their magnetizations are free to rotate relative to one another with a scissoring effect in the presence of an external magnetic field from the recorded magnetic media.

In a pinned-type device either FM1 or FM2 has its magnetization fixed or pinned while the other ferromagnetic layer has its magnetization free to rotate in the presence of an external magnetic field. The pinned ferromagnetic layer is called the reference layer because its magnetization is prevented from rotation. The magnetization of the reference layer can be fixed or pinned by being formed of a high-coercivity film or by being exchange-coupled to an antiferromagnetic (AF) "pinning" layer.

Figure 4:
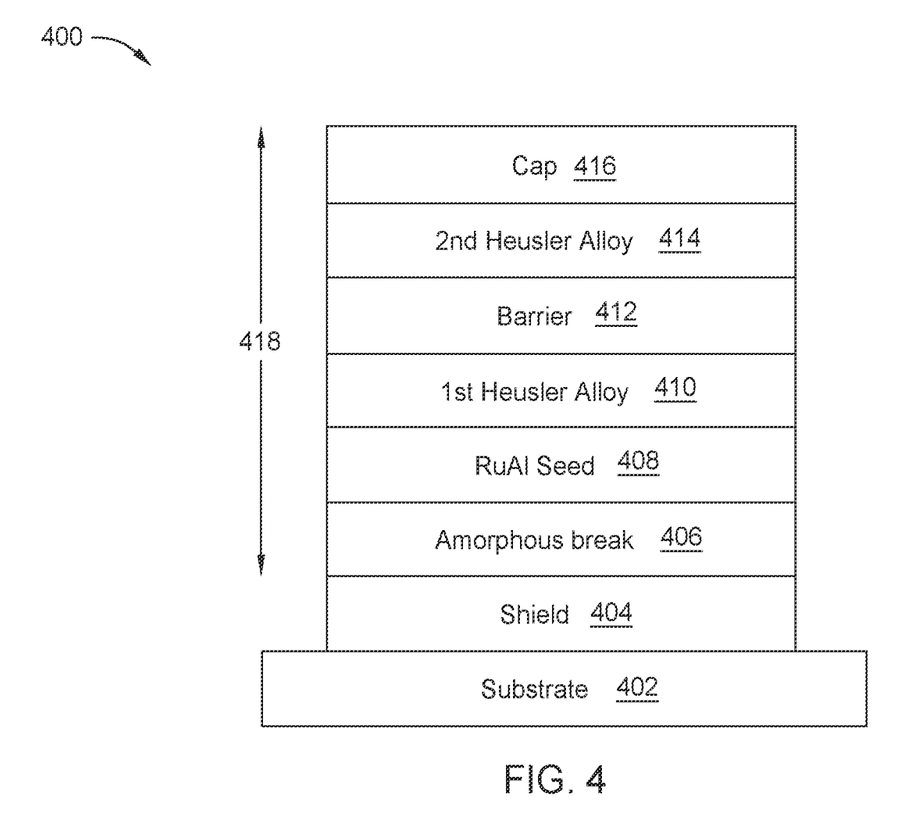
FIG. 4 illustrates a cross-sectional view of a read sensor, according to one embodiment.

FIG. 4 illustrates a cross-sectional view of a read sensor 400, according to one embodiment. The read sensor 400 may be used in the magnetic recording device 100 of FIG. 1 and/or the head assembly 200 of FIG. 2. The read sensor 400 may be the magnetic read head 211 of FIG. 2. The read sensor 400 may be a TMR device or a MTJ device. The read sensor 400 may be a DFL read sensor or a pinned-type read sensor.

The read sensor 400 comprises a substrate 402, a shield 404 disposed on the substrate 402, an amorphous break layer 406 disposed on the shield 404, a seed layer 408 disposed on the amorphous break layer 406, a first Heusler alloy layer 410 disposed on the seed layer 408, a semiconductor barrier layer 412 disposed on the first Heusler alloy layer 410, a second Heusler alloy layer 414 disposed on the semiconductor barrier layer 412, and a cap layer 416 disposed on the second Heusler alloy layer 414. Each layer of the read sensor 400 may be a single layer or a multilayer stack. The substrate comprises MgO, AlTiC, or SiO.

The first Heusler alloy layer 410 is ferromagnetic free layer, and the second Heusler alloy layer 414 is a ferromagnetic layer. The first and second Heusler alloy layers may be referred to as first and second ferromagnetic layers 410, 414, respectively. In some embodiments, the second Heusler alloy layer 414 is also a ferromagnetic free layer. The first and second Heusler alloy layers 410, 414 each individually comprises a Heusler alloy, such as $Co_2FeGe$, $Co_2FeAl$, $Co_2MnGe$, $Co_2MnSi$, $Co_2MnAl$, $Co_2FeSi$, among others, and has a BCC texture. The first and second Heusler alloy layers 410, 414 each individually has a thickness of about 20 Å to about 80 Å, such as about 50 Å. The first and second Heusler alloy layers 410, 414 are ordered Heusler alloys having a high spin polarization.

The shield 404 comprises a magnetic material, such as NiFe, and has an FCC texture. However, as noted above, the Heusler alloy layers 410, 414 have a BCC texture, which does not grow well on a layer having an FCC texture. The amorphous break layer 406 breaks the texture between the shield 404 and the seed layer 408, enabling the seed layer 408 (and subsequently, the first Heusler alloy layer 410) to be grown with a (100) orientation. The seed layer 408 comprises RuAl, has a BCC texture, and has a (100) crystalline orientation. The seed layer 408 has a thickness of about 5 Å to about 60 Å, such as about 50 Å. The first Heusler alloy layer 410 then inherits the BCC texture and (100) orientation of the seed layer 408. The second Heusler alloy layer 414 inherits the (100) orientation of the first Heusler alloy layer 410.

The amorphous break layer 406 comprises CoFeBTa, which may be either magnetic or non-magnetic. The amorphous break layer 406 comprises a Ta composition of about 0% to about 40%, where a lower Ta composition results in the amorphous break layer 406 being magnetic and a higher Ta composition results in the amorphous break layer 406 being non-magnetic. The amorphous break layer 406 has a thickness of about 5 Å to about 50 Å, such as about 30 Å. In some embodiments, the amorphous break layer 406 may be considered part of the seed layer 408.

The barrier layer 412 comprises a semiconductor material, such as ZnSe, ZnTe, ZnO, CuSe, and CuInGaSe, and has a thickness of about 10 Å to about 30 Å, such as about 15 Å. The semiconductor barrier layer 412 enables a low resistance-area product (RA) for the read sensor 400, which in turn helps enable the read sensor 400 to perform ultrahigh density reading. In some embodiments, a spacer layer (not shown) comprising Ag or Cu is disposed between the barrier layer 412 and the second Heusler alloy layer 414. The cap layer 416 comprises a non-magnetic material, such as NiAl, RuAl, Ru, Ta, Ti, or combinations thereof, and has a thickness of about 10 Å to about 60 Å, such as about 20 Å. The amorphous break layer 406 to the cap layer 416 defines a read gap 418 (or shield-to-shield spacing) of the read sensor 400, and the read gap 418 has a thickness of about 12 nm to about 20 nm. Comparatively, conventional read gaps generally have a thickness greater than about 20 nm. While not show, a second shield may be disposed on the cap layer 416.

After the amorphous break layer 406 is deposited on the shield 404, the deposited layers (e.g., the substrate 402, the shield 404, and the amorphous break layer 406) are heated to about 200° ° C. to about 300° C. for about 10 seconds to about 10 minutes, which is significantly less than conventional heating temperatures of read heads, which are often heated to about 500° C. Similarly, once the seed layer 408 is deposited on the amorphous break layer 406, the deposited layers (e.g., the substrate 402, the shield 404, the amorphous break layer 406, and the seed layer 408) are again heated to about 200° C. to about 300° C. for about 10 seconds to about 10 minutes.

By using lower annealing temperatures of about 200° C. to about 300° C. to heat the structure, the read sensor 400 is able to withstand the annealing process without breaking down. Heating the structure after depositing each of the amorphous break layer 406 and the seed layer 408 improves the crystallinity and reduces strain, which help the amorphous break layer 406 to break the texture between the shield 404 and the seed layer 408, allowing for the seed layer 408 and the Heusler alloy layers 410, 414 to have an ordered (100) growth. As such, the amorphous break layer 406 and the seed layer 408 result in the read sensor 400 having a single crystal structure throughout, where each layer from the amorphous break layer 406 to the cap layer 416 have a (100) orientation. Furthermore, the ordered seed layer 408 and the ordered Heusler alloy layers 410, 414 enable the read sensor 400 to have a high magnetic resistance (MR). Thus, the read head 400 has a high MR and a low RA, making the read sensor 400 an ultrahigh density read sensor while also reducing the read gap 418.

Figure 5A:
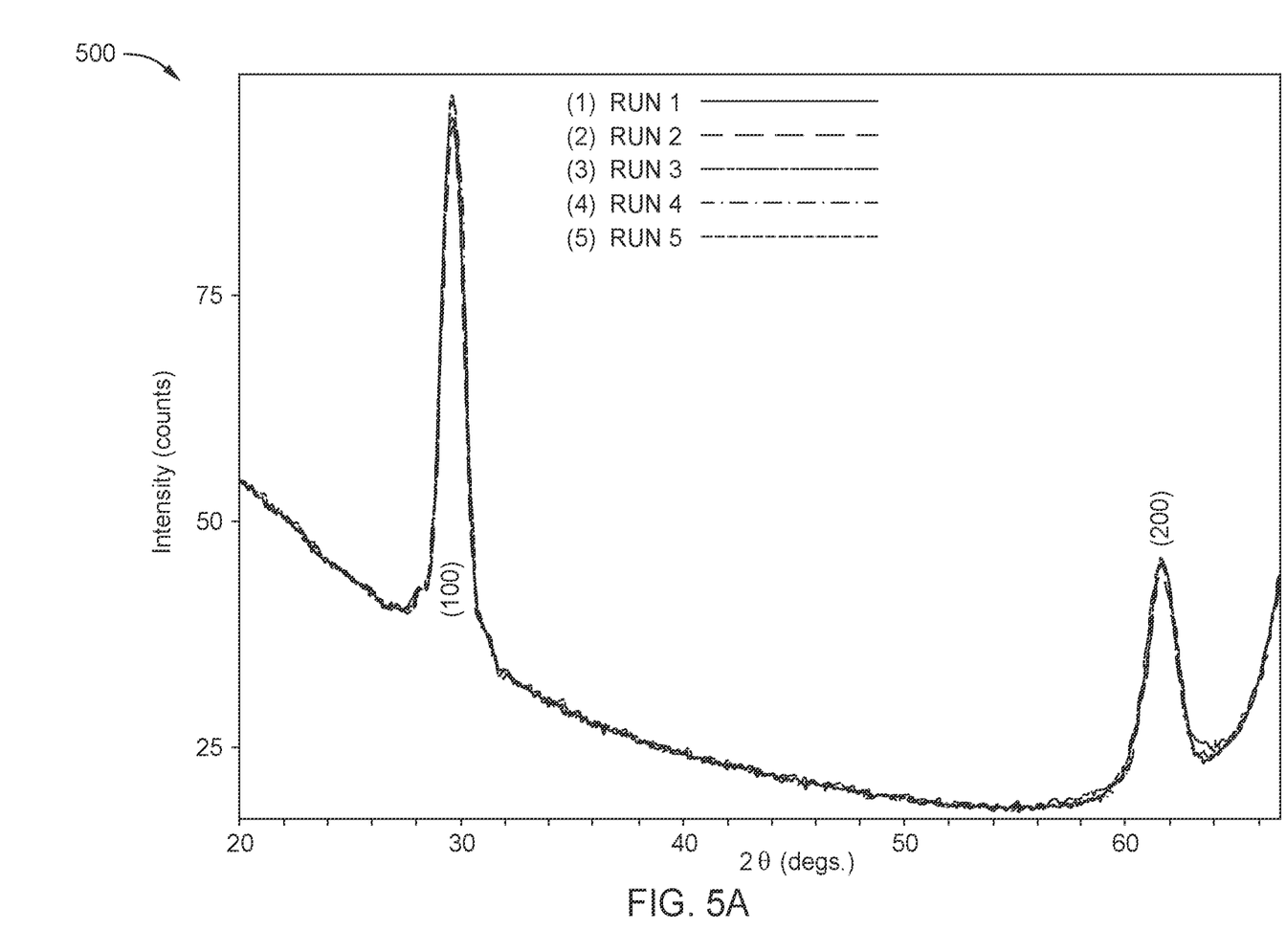
FIG. 5A illustrates a graph showing the orientation of the seed layer of the read sensor of FIG. 4 after the amorphous break layer has been heated, according to one embodiment.

FIG. 5A illustrates a graph 500 showing the orientation of the seed layer 408 of the read sensor 400 after the amorphous break layer 406 has been heated at about 200° C. to about 300° C., like discussed above, according to one embodiment. As shown in FIG. 5A, the RuAl seed layer 408 has a (100) orientation upon being deposited on the previously-heated amorphous break layer 406. Thus, the amorphous break layer 406 breaks the FCC texture of the shield 404, allowing the seed layer 408 to have a BCC texture.

Figure 5B:
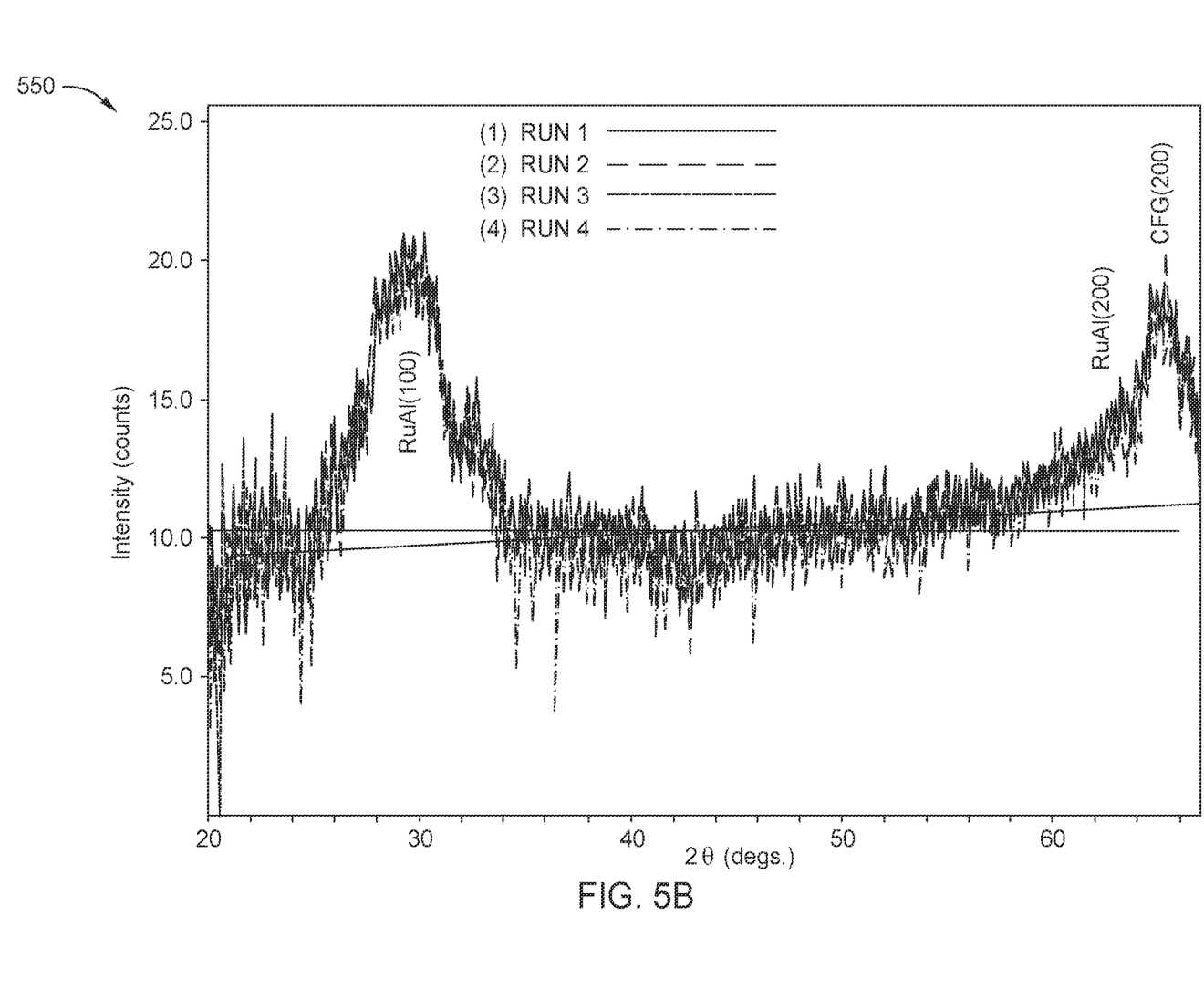
FIG. 5B illustrates a graph showing the orientation of the first Heusler alloy layer of the read sensor of FIG. 4 after the seed layer has been heated, according to one embodiment.

FIG. 5B illustrates a graph 550 showing the orientation of the first Heusler alloy layer 410 of the read sensor 400 after the seed layer 408 has been heated at about 200° C. to about 300° C., like discussed above, according to one embodiment. As shown in FIG. 5B, the first Heusler alloy layer 410 has a (100) orientation upon being deposited on the previously-heated seed layer 408. Thus, the first Heusler alloy layer 410 successfully inherits the BCC texture and (100) orientation of the seed layer 408 to be a highly ordered Heusler alloy layer.

By utilizing an amorphous break layer disposed between the shield and the seed layer, the texture between the shield and the seed layer is broken, allowing the seed layer to have a BCC texture and a (100) orientation. The BCC texture and (100) orientation of the seed layer is then inherited by the first Heusler alloy layer, the barrier layer, and the second Heusler alloy layer, resulting in the read sensor having a single crystal structure throughout. The ordered seed layer and the ordered Heusler alloy layers enable the read sensor to have a high MR. Furthermore, the barrier layer comprising a semiconductor material lowers the RA of the read head. Thus, the read head has a high MR and a low RA, making the read sensor an ultrahigh density read sensor while also reducing the read gap.

In one embodiment, a read sensor comprises a shield, an amorphous break layer disposed over the shield, a seed layer disposed over the amorphous break layer, the seed layer having a BCC texture and a (100) orientation, a first ferromagnetic layer disposed over the seed layer, the first ferromagnetic layer having a BCC texture and a (100) orientation, a barrier layer disposed over the first ferromagnetic layer, the barrier layer comprising a semiconductor material, and a second ferromagnetic layer disposed over the barrier layer.

The barrier layer comprises ZnSe, ZnTe, ZnO, CuSe, or CuInGaSe. The amorphous break layer comprises CoFeBTa, and wherein the seed layer comprises RuAl. A composition of Ta in the amorphous break layer is between about 0% to about 40%. The shield has a FCC texture. The second ferromagnetic layer has a BCC texture and a (100) orientation. The first ferromagnetic layer and the second ferromagnetic layer each individually comprises a Heusler alloy. A magnetic read head comprises the read sensor. A magnetic recording device comprises the magnetic read head.

In another embodiment, a read sensor comprises a shield, an amorphous break layer disposed over the shield, a seed layer comprising RuAl disposed over the amorphous break layer, the seed layer having a BCC texture and a (100) orientation, a first Heusler alloy layer disposed over the seed layer, the first Heusler alloy layer having a BCC texture and a (100) orientation, a semiconductor barrier layer disposed over the first Heusler alloy layer, the semiconductor barrier layer comprising ZnSe, ZnTe, ZnO, CuSe, or CuInGaSe, and a second Heusler alloy layer disposed over the semiconductor barrier layer, the second Heusler alloy layer having a BCC texture and a (100) orientation.

The amorphous break layer comprises CoFeBTa, where a composition of Ta in CoFeBTa is between about 0% to about 40%. The first Heusler alloy layer and the second Heusler alloy layer each individually comprises a material selected from the group consisting of $Co_2FeGe$, $Co_2FeAl$, $Co_2MnGe$, $Co_2MnSi$, $Co_2MnAl$, and $Co_2FeSi$. The first Heusler alloy layer is a ferromagnetic free layer. A magnetic read head comprises the read sensor. A magnetic recording device comprises the magnetic read head.

In yet another embodiment, a read sensor comprises a substrate, a magnetic shield disposed on the substrate, the magnetic shield having a FCC texture, an amorphous break layer disposed on the shield, the amorphous break layer comprising CoFeBTa, a seed layer comprising RuAl disposed on the amorphous break layer, the seed layer having a BCC texture and a (100) orientation, a first ferromagnetic layer disposed on the seed layer, the first ferromagnetic layer having a BCC texture and a (100) orientation, a semiconductor barrier layer disposed on the first ferromagnetic layer, the semiconductor barrier layer comprising ZnSe, ZnTe, ZnO, CuSe, or CuInGaSe, a second ferromagnetic layer disposed over the barrier layer, the second ferromagnetic layer having a BCC texture and a (100) orientation, and a cap layer disposed over the second ferromagnetic layer.

The first ferromagnetic layer and the second ferromagnetic layer each individually comprises a Heusler alloy selected from the group consisting of $Co_2FeGe$, $Co_2FeAl$, $Co_2MnGe$, $Co_2MnSi$, $Co_2MnAl$, and $Co_2FeSi$. The amorphous break layer, the seed layer, the first ferromagnetic layer, the semiconductor barrier layer, the second ferromagnetic layer, and the cap layer have a collective thickness of about 15 nm to about 17 nm. A composition of Ta in the amorphous break layer is between about 0% to about 40%. A magnetic read head comprises the read sensor. A magnetic recording device comprises the magnetic read head.

While the foregoing is directed to embodiments of the present disclosure, other and further embodiments of the disclosure may be devised without departing from the basic scope thereof, and the scope thereof is determined by the claims that follow.

What is claimed is:

1. A read sensor, comprising:
   a shield;
   an amorphous break layer disposed over the shield;
   a seed layer disposed over the amorphous break layer, the seed layer having a BCC texture and a (100) orientation;
   a first ferromagnetic layer disposed over the seed layer, the first ferromagnetic layer having a BCC texture and a (100) orientation;
   a barrier layer disposed over the first ferromagnetic layer, the barrier layer comprising a semiconductor material; and
   a second ferromagnetic layer disposed over the barrier layer.

2. The read sensor of claim 1, wherein the barrier layer comprises ZnSe, ZnTe, ZnO, CuSe, or CuInGaSe.

3. The read sensor of claim 1, wherein the amorphous break layer comprises CoFeBTa, and wherein the seed layer comprises RuAl.

4. The read sensor of claim 3, where a composition of Ta in the amorphous break layer is between about 0% to about 40%.

5. The read sensor of claim 1, wherein the shield has a FCC texture.

6. The read sensor of claim 1, wherein the second ferromagnetic layer has a BCC texture and a (100) orientation.

7. The read sensor of claim 1, wherein the first ferromagnetic layer and the second ferromagnetic layer each individually comprises a Heusler alloy.

8. A magnetic read head comprises the read sensor of claim 1.

9. A magnetic recording device comprises the magnetic read head of claim 8.

10. A read sensor, comprising:
    a shield;
    an amorphous break layer disposed over the shield;
    a seed layer comprising RuAl disposed over the amorphous break layer, the seed layer having a BCC texture and a (100) orientation;
    a first Heusler alloy layer disposed over the seed layer, the first Heusler alloy layer having a BCC texture and a (100) orientation;
    a semiconductor barrier layer disposed over the first Heusler alloy layer, the semiconductor barrier layer comprising ZnSe, ZnTe, ZnO, CuSe, or CuInGaSe; and
    a second Heusler alloy layer disposed over the semiconductor barrier layer, the second Heusler alloy layer having a BCC texture and a (100) orientation.

11. The read sensor of claim 10, wherein the amorphous break layer comprises CoFeBTa, where a composition of Ta in CoFeBTa is between about 0% to about 40%.

12. The read sensor of claim 10, wherein the first Heusler alloy layer and the second Heusler alloy layer each individually comprises a material selected from the group consisting of $Co_2FeGe$, $Co_2FeAl$, $Co_2MnGe$, $Co_2MnSi$, $Co_2MnAl$, and $Co_2FeSi$.

13. The read sensor of claim 10, wherein the first Heusler alloy layer is a ferromagnetic free layer.

14. A magnetic read head comprises the read sensor of claim 10.

15. A magnetic recording device comprises the magnetic read head of claim 14.

16. A read sensor, comprising:
    a substrate;
    a magnetic shield disposed on the substrate, the magnetic shield having a FCC texture;
    an amorphous break layer disposed on the shield, the amorphous break layer comprising CoFeBTa;
    a seed layer comprising RuAl disposed on the amorphous break layer, the seed layer having a BCC texture and a (100) orientation;
    a first ferromagnetic layer disposed on the seed layer, the first ferromagnetic layer having a BCC texture and a (100) orientation;
    a semiconductor barrier layer disposed on the first ferromagnetic layer, the semiconductor barrier layer comprising ZnSe, ZnTe, ZnO, CuSe, or CuInGaSe;
    a second ferromagnetic layer disposed over the barrier layer, the second ferromagnetic layer having a BCC texture and a (100) orientation; and
    a cap layer disposed over the second ferromagnetic layer.

17. The read sensor of claim 16, wherein the first ferromagnetic layer and the second ferromagnetic layer each individually comprises a Heusler alloy selected from the group consisting of $Co_2FeGe$, $Co_2FeAl$, $Co_2MnGe$, $Co_2MnSi$, $Co_2MnAl$, and $Co_2FeSi$.

18. The read sensor of claim 16, wherein the amorphous break layer, the seed layer, the first ferromagnetic layer, the semiconductor barrier layer, the second ferromagnetic layer, and the cap layer have a collective thickness of about 15 nm to about 17 nm.

19. The read sensor of claim 16, wherein a composition of Ta in the amorphous break layer is between about 0% to about 40%.

20. A magnetic read head comprises the read sensor of claim 16.

21. A magnetic recording device comprises the magnetic read head of claim 20.

* * * * *